United States Patent Office 3,539,274
Patented Nov. 10, 1970

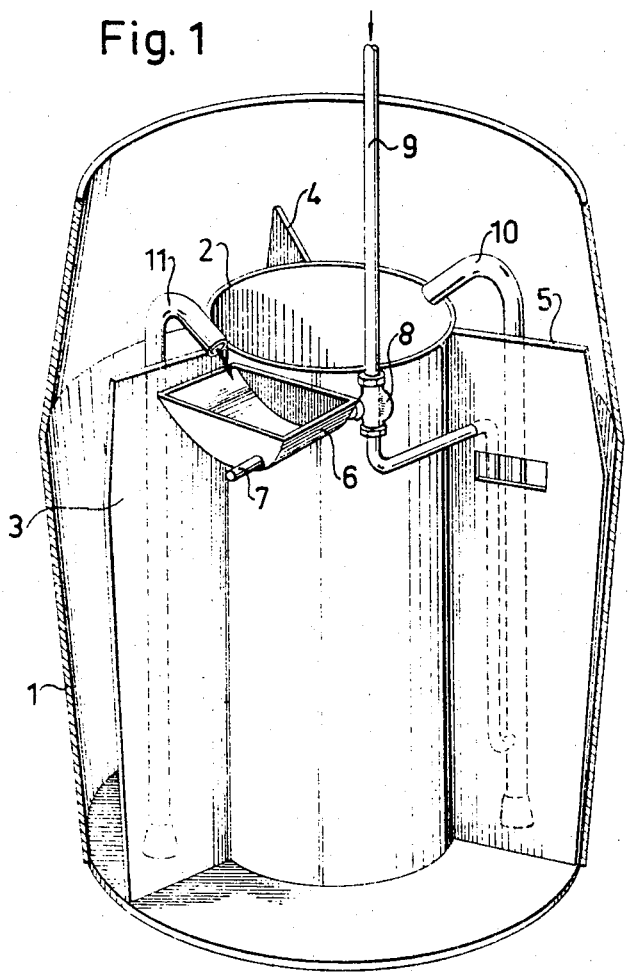
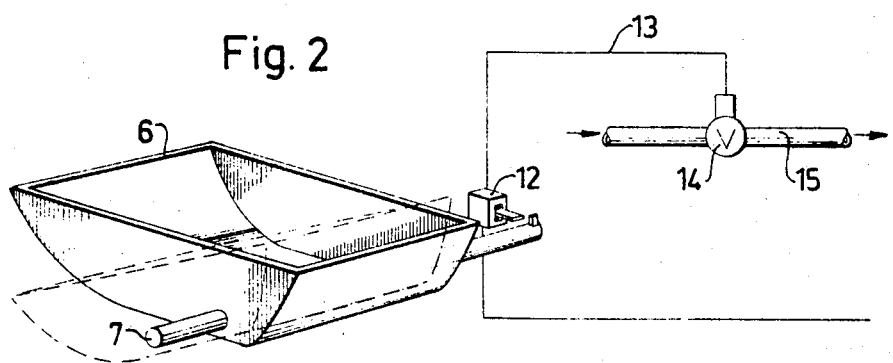

3,539,274
SLUDGE METERING APPARATUS
Nils-Olof Nordlander, Sigtuna, Sweden, assignor to
Stenberg-Flygt AB, Solna, Sweden
Filed Dec. 3, 1968, Ser. No. 780,788
Claims priority, application Sweden, Dec. 5, 1967,
16,722/67
Int. Cl. F04b 49/02; F04f 1/06, 5/24
U.S. Cl. 417—44                                    5 Claims

ABSTRACT OF THE DISCLOSURE

Determined quantities of activated sludge are charged to sewage water by a tiltably mounted metering scoop which periodically executes an emptying movement when filled with a certain quantity of sewage water, said scoop via a movable member being connected to coupling means for controlling an auxiliary medium circuit for supervising the supply of sludge to the system.

In the U.S.A. patent application (U.S.A. Ser. No. 717,547) is described a method in the aerobic treatment of sewage water in which regenerated sludge, i.e. activated sludge, is metered to the incoming sewage water in certain given proportions, as opposed to conventional systems which operate with constant sludge circulation per unit of time, i.e. variable sludge concentration.

The present invention is concerned with an apparatus which enables a certain quantity of activated sludge to be metered to the sewage water in dependence on the amount thereof. The apparatus includes a sewage scoop which can be emptied and filled periodically and which executes an emptying movement when filled with a predetermined quantity of water.

The metering apparatus according to the invention is mainly characterized in that the metering scoop is connected, via a movable member cooperating therewith, to coupling means for controlling an auxilary medium circuit, and that the auxiliary medium in said circuit is adapted to control the supply of sludge to the system in response to the coupling means. The auxiliary medium is suitably compressed air and said coupling means a valve or electric switch. In one embodiment of the invention sludge is metered to the sewage water by an air-lift pump operated with compressed air from the auxiliary medium circuit. The supply of compressed air to the pump is suitably controlled by a valve capable of being actuated electromagnetically by the electric switch adapted to be actuated by movement of the scoop.

The invention will now be described with reference to the accompanying drawing, in which:

FIG. 1 shows an embodiment of the invention applied in a flocculating type water purification system, in which a metering scoop actuated direct via its bearing axis a valve in a compressed-air feed line and FIG. 2 shows a modification of the embodiment shown in FIG. 1 in which the bearing shaft of the scoop actuates a switch which in turn controls a magnetic valve in a feed line for, e.g. compressed air In FIG. 1 there is shown an embodiment of the invention intended for a sewage water purification system. The system includes a well 1 which is divided into four sewage and sludge treatment chambers by means of a concentrical cylinder 2 and walls 3, 4, 5 which extend radially outwards therefrom. Thus, there is located between the walls 3 and 4 a mixing chamber in which newly supplied sewage water and regenerated sludge can be mixed, between walls 3 and 5 a flocculation chamber in which floc is formed and where regenerated sludge may also be intermixed; between walls 5 and 4 a sedimentation chamber in which the sludge is allowed to settle; while finally the cylindrical inner space provides a sludge regenerating chamber, in which the sludge is aerated.

The metering scoop 6 of the invention is thought to be mounted about a shaft 7 which is journalled in the front side of the wall of the well 1 and which constitutes a rotary actuator for a valve 8 in an air line 9 which is adapted to feed compressed air to an air lift pump 10, which in turn is adapted to pump sludge from the sedimentation chamber to the regenerating chamber. The sewage water is intended to be supplied to the scoop 6 by an air lift pump 11 operated on compressed air, for instance from line 9 through another line which is not shown in the drawing. The scoop is so mounted in its bearings, that when empty the scoop occupies the position shown in the drawing with full lines, and when filled with a predetermined quantity of sewage water tips and passes to position shown by Morse lines. As previously mentioned, in the illustrated embodiment the bearing shaft is conceived to be a rotary actuator for valve 8 in the air supply line 9, the design of the valve being such that it is open when the scoop occupies the position shown by Morse lines and closed when the scoop is in the full line position. In this way it is possible to actuate the air lift pump 10 in response to the quantity of sewage water fed to the fluocculating chamber from the mixing member—i.e. in dependence of the quantity of main substance supplied, so that said pump 10 pumped a quantity of sludge proportionate to the quantity of sewage water fed to the system from the sedimentation chamber to the regenerating chamber, from where the sludge is passed to the mixing chamber or fluocculation chamber via a spillway for example. Thus, by determining the time during which air is fed to the air lift pump 10, sludge (i.e. addition substance) can be metered to the newly supplied sewage water in the desired quantities.

FIG. 2 illustrates diagrammatically a modification of the embodiment shown in FIG. 1, in which the scoop 6 through the intermediary of its shaft 7 actuates instead a switch 12 which actuates a magnetic valve 14 via an electric line 13, which is only indicated in the drawing. In turn, the magnetic valve 14 can either open a supply conduit 15 conducting the addition substance or, as in the former embodiment, supply an auxiliary medium such as compressed air, to influence the quantity of addition substance supplied.

Although the invention has been described with reference to two embodiments thereof it can be varied within the scope of the following claims.

What I claim is:

1. A metering apparatus for automatically pumping determined quantities of activated sludge into sewage water, including a tiltably mounted metering scoop which is emptied and filled periodically with sewage water and which executes an emptying movement when filled with a certain quantity of sewage water, characterized in that the scoop (6) is connected, via a movable member (7) cooperating therewith, to a coupling means (8) which controls an auxiliary medium supply circuit (9), and that the auxiliary medium in said circuit is used to pump the supply of sludge into said sewage water.

2. A metering apparatus according to claim 1, characterized in that the auxiliary medium is compressed air and the coupling means a valve (8).

3. A metering apparatus according to claim 1, characterized in that the coupling means is a switch (12).

4. A metering apparatus according to claim 2 characterized in that it includes an air lift pump (10) operated by compressed air from the auxiliary medium supply circuit (9) and adapted to pump sludge into said sewage water.

5. A metering apparatus according to claim 4, characterized in that the supply of compressed air to the air pump (10) is governed by a valve (8) which can be actuated electromagnetically (electric circuit 13, magnetic valve 14) by the electric switch (12) actuated by movement of the scoop.

References Cited

UNITED STATES PATENTS

| | | |
|---|---|---|
| 2,730,961 | 1/1956 | Yeomans _____ 103—248 X |
| 3,132,773 | 5/1964 | Hampton _____ 103—263 X |
| 3,213,795 | 10/1965 | Parks et al. _____ 103—35 |
| 3,262,396 | 7/1966 | Kingsbury _____ 103—25 X |
| 3,309,474 | 3/1967 | Heinrick _____ 103—25 |
| 3,410,222 | 11/1968 | Swanton _____ 103—240 |
| 3,422,768 | 1/1969 | Repp _____ 103—240 X |
| 3,448,689 | 6/1969 | Caldwell _____ 103—25 |

DONLEY J. STOCKING, Primary Examiner

W. J. KRAUSS, Assistant Examiner